United States Patent [19]

Sasaki et al.

[11] 4,107,085

[45] Aug. 15, 1978

[54] PROCESS FOR PRODUCTION OF ATTRITION RESISTANT ANTIMONY OXIDE CONTAINING FLUIDIZED BED CATALYST HAVING CONTROLLED PARTICLE SIZE DISTRIBUTION

[75] Inventors: Yutaka Sasaki, Yokohama; Yoshimi Nakamura, Kawasaki, both of Japan

[73] Assignee: Nitto Chemical Industry Co., Ltd., Tokyo, Japan

[21] Appl. No.: 797,957

[22] Filed: May 18, 1977

[30] Foreign Application Priority Data

May 19, 1976 [JP] Japan .................................. 51-56686

[51] Int. Cl.² .......................... B01J 37/00; B01J 29/16
[52] U.S. Cl. .................................. 252/448; 252/456; 252/459
[58] Field of Search ........................ 252/456, 448, 459

[56] References Cited

U.S. PATENT DOCUMENTS

| | | | |
|---|---|---|---|
| 2,665,258 | 1/1954 | Lebeis, Jr. ............................. | 252/448 |
| 2,831,652 | 4/1958 | Gemperle et al. .................... | 252/448 |
| 3,686,138 | 8/1972 | Yoshino et al. ....................... | 252/456 |
| 3,746,659 | 7/1973 | Horzepa ............................... | 252/448 |

*Primary Examiner*—Carl F. Dees
*Attorney, Agent, or Firm*—Sughrue, Rothwell, Mion, Zinn and Macpeak

[57] ABSTRACT

A process for producing an attrition resistant antimony oxide containing fluidized bed catalyst comprising particles within a controlled particle size distribution comprising: (a) preparing a slurry containing a pentavalent antimony compound, one or more polyvalent metal compounds and a silica sol as essential components; (b) adjusting the pH of the above slurry to not more than 7 and heating the slurry at a temperature of from about 40° C to about 150° C for at least 20 minutes while keeping the mixture in a slurry state to form a slurry containing pentavalent antimony; (c) spray-drying the thus obtained slurry to form substantially spherical particles; (d) separating extremely fine particles and/or coarse particles unsuitable for practical use from the above obtained particles and returning these separated particles to the slurry prior to the spray-drying in step (c) as they are or after the pulverization thereof; and (e) calcining the particles from which the extremely fine particles and/or coarse particles have been removed at a temperature of from about 400° C to about 1100° C.

18 Claims, No Drawings

PROCESS FOR PRODUCTION OF ATTRITION RESISTANT ANTIMONY OXIDE CONTAINING FLUIDIZED BED CATALYST HAVING CONTROLLED PARTICLE SIZE DISTRIBUTION

BACKGROUND OF THE INVENTION

1. Field of the Invention

The present invention relates to a process for production of a solid catalyst containing antimony oxide as one of the effective components and suitable for use in fluidized bed reactions. More particularly, it is concerned with a process for production of a fluidized bed solid catalyst containing attrition resistant antimony oxide which does not contain extremely fine particles nor coarse particles unsuitable for practical use and whose particle diameter is controlled.

2. Description of the Prior Art

Antimony oxide-containing catalysts are useful for ammoxidation of olefins to the corresponding unsaturated nitriles, oxidation of olefins to the corresponding aldehydes, and oxidative dehydrogenation of olefins to the corresponding diolefins, and these catalysts are described for example, in U.S. Pat. Nos. 3,657,155, 3,686,138, 3,716,496 and 3,988,359. The above described reactions can be effected in either a fixed bed or a fluidized bed, but they are generally carried out in a fluidized bed with which it is easy to remove the reaction heat since the heat of reaction thereof is great. In this fluidized bed reaction, it is important, of course, for the activity and strength of the catalyst to be high for the reaction to effectively proceed by keeping the catalyst particles in a good fluidized state. It is also well known that a suitable particle size distribution is very important. The particle diameter of the catalysts used in this fluidized bed reaction is generally not more than 500 $\mu$ and the average particle diameter is generally in a range of about 40 $\mu$ to 200 $\mu$.

With regard to a process for production of an antimony oxide-containing fluidized bed catalyst, a method has been proposed comprising preparing a slurry containing an antimony compound, a polyvalent metal compound and a silica sol as essential components, adjusting the pH of the slurry, heat-treating the slurry, subjecting the slurry so treated to a spray-drying operation to form spherical particles, and calcining the resulting particles, as described in U.S. Pat. Nos. 3,657,155 and 3,686,138. In this process, a catalyst having the desired particle size distribution is produced by controlling the spray-drying conditions in subjecting the above slurry to the spray-drying operation. By such an operation, however, it is quite difficult to produce the objective catalyst having the desired particle size distribution.

That is, in accordance with the above process, unnecessary small catalyst particles are more or less produced inevitably. In a fluidized bed reaction, these small catalyst particles cause the problems in that they are quickly lost during the reaction, resulting in a reduction in the yield of the object product and in an increase in catalyst unit cost and in that the amount of waste solids increases, resulting in the formation of pollution problems. On the other hand, if the above described spray-drying conditions are controlled to produce those catalyst particles having larger particle diameters so that the above described problems are eliminated, those catalyst particles having a particle size distribution in which coarse particle are predominent, are produced, and thus problems occur in that the fluidizability of the particles deteriorates and good results are not obtained.

The problem arises in the fluidized bed reaction that even though catalyst particles having a suitable size distribution are employed, those catalyst particles having a small diameter are inevitably scattered and lost, and thus the proper particle size distribution is destroyed and those catalyst particles having greater diameters become predominent. In this case, it is necessary to produce make-up catalyst particles having smaller diameters so that the proper particle size distribution is maintained. In producing catalysts with appropriate particle diameters for make-up, however, it is quite difficult to obtain a catalyst of the desired particle size distribution only by controlling the above described spray-drying conditions.

Under these circumstances, the catalyst particles of relatively small diameters have inevitably been produced and used as a make-up catalyst, and thus it has been considered inevitable that the amount of the particles to be scattered and lost will increase during the use thereof.

Also a process for production of an antimony oxide-containing fluidized bed catalyst has been proposed as described in Japanese Patent Application (OPI) No. 40288/1974, for useful utilization of coarse catalyst particles formed on use of the catalyst. In accordance with this process, the coarse catalyst is pulverized to particles of a diameter of 20 $\mu$ or less, and the pulverized catalyst is incorporated into the slurry at an appropriate step prior to the spray-drying according to the method disclosed in U.S. Pat. No. 3,657,155 so that the pulverized catalyst constitutes not more than 50% by weight of the total catalyst weight.

This method of producing catalysts can be utilized as a method of producing catalyst for controlling the particle diameter. Thus, it is possible to produce a catalyst of the desired particle size distribution by removing extremely fine particles and/or coarse particles unsuitable for practical use. However, since the catalyst removed has been calcined at elevated temperatures and has a high strength, the pulverization thereof requires a great deal of energy. In addition, at the time of the spray-drying of the slurry with the catalyst incorporated therein, pieces of apparatus such as a slurry pump, nozzles and the like are subject to a high degree of abrasion and frequent change of parts is needed. Furthermore, in the case, the amount of the pulverized catalyst which can be incorporated is limited; that is, if the pulverized catalyst is added in an amount above 50% by weight, the strength of the final catalyst markedly decreases and thus the final catalyst becomes unsuitable for practical use.

SUMMARY OF THE INVENTION

An object of the present invention is to remove the above described problems of the prior art method in producing an antimony oxide-containing fluidized bed catalyst and the present invention provides a process for producing an antimony oxide-containing fluidized bed catalyst which has the desired particle size distribution but not containing those particles unsuitable for practical use and which has high strength and activity.

Thus, the present invention provides a process for producing a fluidized bed catalyst containing antimony oxide which is attrition resistant and whose particle diameter is controlled, which comprises (a) preparing a slurry containing an antimony compound, a polyvalent metal compound and silica sol as essential components and in addition, if necessary, ferric ions and nitrate ions, (b) adjusting the pH of the resulting slurry and heating the slurry for at least 20 minutes at a temperature of about 40° C to about 150° C while keeping the mixture in a slurry state to form a catalyst slurry containing pentavalent antimony, (c) spray-drying the slurry thus obtained to form substantially spherical particles, (d) separating extremely fine particles and/or coarse particles unsuitable for practical use from the above spherical particles and returning the separated extremely fine and/or coarse particles to the slurry prior to the spray-drying in step (c) as they are or after a pulverization thereof, and (e) calcining the particles from which the extremely fine particles and/or coarse particles unsuitable for practical use have been removed at a temperature of from about 400° C to about 1100° C.

DETAILED DESCRIPTION OF THE INVENTION

The method of the present invention is applicable to all Sb—Me based catalyst (wherein Me indicates at least one polyvalent metal), and preferably applicable particularly to those Sb—Fe based catalysts which contain or which do not contain a small amount of promoters. In preferred catalysts, the Me/Sb atomic ratio is in a range of from about 1:10 to about 5:1, and the highest activity is obtained in the range of from about 1:5 to about 1:1.

Antimony compounds which can be used in the present invention include a nitric acid oxidized metallic antimony (i.e. the product of oxidation of metallic antimony with nitric acid), basic antimony nitrate, antimony trioxide, antimony pentoxide, antimonic acid, antimony trichloride, antimony pentachloride, a hydrolysis product of antimony trichloride, a hydrogen peroxide oxidized antimony trioxide (the oxidized product of antimony trioxide with hydrogen peroxide), antimony pentoxide sol, and other antimony compounds. It is preferred, however, that the chlorides are used after the removal of excess chloride ion by hydrolysis. These compounds are preferably present as a fine dispersion in an aqueous medium, more preferably in a colloidal state or in a state similar to that of a solution. Other oxidants such as hydrogen peroxide or potassium permanganate can also be used.

Where trivalent compounds are used as antimony compounds, (i) as one method, the trivalent compound must be oxidized in the slurry heating step hereinafter described. For this reason, it is necessary for ferric ions and nitrate ions to be present in the slurry for forming the catalyst. Where ferric nitrate is used as a polyvalent metal compound, the above requirement is naturally satisfied. However, where other compounds are used, they must be used in combination with those compounds capable of releasing ferric ions and/or nitrate ions.

With regard to the amount of the ferric ion in the slurry, it is at least 1 g ion per 100 g atom of antimony, preferably 5 to 500 g ion. With regard to the amount of the nitrate ion in the slurry, it is about 1 to about 2000 g ion equivalent per 100 g atom of antimony, preferably from about 50 to about 2000 g ion equivalent.

As suitable iron ion sources, those compounds capable of releasing ferric ions in the slurry can be used, and soluble ferric salts such as ferric nitrate, ferric hydroxide, and the like can be used. As nitrate ion sources, those corresponding to the ions present in the starting materials of the catalyst such as nitric acid oxidized antimony nitrates or polyvalent metals, and the like can be utilized. In addition, nitric acid can be used as a nitrate ion source.

As another method (ii), trivalent antimony can be oxidized prior to the heat processing of the slurry or at the time of processing using oxidizing agents such as hydrogen peroxide, potassium permanganate, and the like.

Polyvalent metal compounds which can be used in the present invention are those metal compounds selected from the group consisting of iron, cobalt, nickel, tin, uranium, chromium, copper, maganese, titanium, vanadium, molybdenum, tungsten, tellurium, bismuth, thorium, cerium, magnesium, zinc, aluminum and zirconium. These polyvalent metal compounds can be used individually or in combination with each other.

The nitrate salts of iron, cobalt, nickel, uranium, chromium, copper, manganese, bismuth, thorium, magnesium, zinc, aluminum and zirconium can be conveniently used as starting materials for these components. As the starting material for the vanadium component, water-soluble compounds such as ammonium metavanadate, vanadyl oxalate, and the like can be conveniently used. As the starting materials for the molybdenum and tungsten components, ammonium paramolybdate, ammonium paratungstate and the other water-soluble compounds can be conveniently used.

Suitable starting materials for tellurium include the oxides thereof such as tellurium dioxide, nitric acid oxidized tellurium (i.e. the oxidation product of tellurium with nitric acid), tellurous acid, telluric acid and the like can be used. As the starting materials for the titanium and tin components, the chlorides thereof can be used.

As the silica sol, a suitable one can be selected from commercially available silica sols. The concentration of the silica sol is used in a range of from about 5 to about 90% by weight as silicon dioxide content, and generally in a range of from about 10% by weight to about 50% by weight. The amount of the silica sol to be used corresponds to about 10 to 90 parts by weight, as silicon dioxide, per 100 parts by weight of the final catalyst.

In the practice of the method of the present invention, the above described antimony compound, polyvalent metal compound and silica sol are mixed to prepare a slurry. In this case, where the antimony compound is a trivalent antimony compound, the ferric ion and nitrate ion are introduced into the slurry. In the present invention, those particles to be admixed can be introduced into the slurry at this step. At this time, the slurry concentration is preferably in the range of from about 0.5 to about 50% by weight, calculated as the oxide of the element forming the catalyst. While the order of adding the catalyst components is not critical, those compounds in a solution state, a colloidal state and a particle dispersion state in which precipitation easily takes place, are added in this order from the point of view of ease of operation and dispersion uniformity of the components.

Then the pH of the slurry is adjusted to 7 or less, preferably to a range of from about 1 to about 4. In adjusting the pH, the slurry is stirred well so that a localized increase in pH can be prevented. Volatile acids or volatile bases can be used as pH adjusting agents. Examples of acids which can be used include nitric acid, various kinds of organic acids such as formic acid, oxalic acid, citric acid, tartaric acid, and the like, carbon dioxide gas, carbonic acid aqueous solution, etc.

Of these compounds, nitric acid is particularly preferred. Aqueous ammonia, organic amines such as methylamine, ethylamine, aniline and the like, pyridines, quinolines, etc., can be used as bases. Of these compounds, aqueous ammonia is most preferred.

The slurry prepared as hereinabove described is then heated at a temperature of from about 40° C to about 150° C, preferably 80° to 100° C for at least about 20 minutes, preferably about 1 to 12 hours. By this processing, complicated physical and chemical changes take place in the slurry so that attrition resistance is provided to the catalyst. During the period of this heating processing, all or at least one of a phenomena such as an increase in viscosity of the slurry, a variation in pH and in color tone, a pulverization in the antimony compound particles, a change in the antimony atomic valance of one portion of the antimony compound ($Sb^{III} \rightarrow Sb^V$), a quantitative change in free trivalent iron, a qualitative and quantitative change in silica particles in the sol state, a formation of nitrous acid, and the like are observed. These phenomena suggest that the various types of catalyst components present in the slurry are being subjected to complicated chemical changes.

For attaining the above described object, the temperature required is not less than about 40° C, and above a temperature of about 40° C, the reaction takes place more or less. In particular, at elevated temperatures of not less than about 80° C, the above effect is more rapid and great. The preferred processing time ranges from about 1 to about 12 hours.

The above heating processing may be carried out either using a system in which the slurry is concentrated in an open type of apparatus, or a system in which the water evaporated from the slurry is recycled in a closed system. In general, where a dilute slurry is subjected to heating processing, the former system is advantageously employed, whereas where a concentrated slurry is subjected to heating processing, the latter system is advantageously employed.

In this heating processing, it is important for the processing to be carried out while keeping the mixture in a slurry state, and in any case, evaporation to dryness should be avoided. The preparation and heating processing of the slurry are preferably carried out with uniform agitation. Thus the use of a means of agitation such as stirrer is recommended. In the present invention, those particles to be admixed can be mixed with the slurry subjected to the heating processing.

The slurry containing pentavalent antimony which has been subjected to the heating processing is then spray dried to form substantially spherical particles. The spray drying conditions are not critical and known techniques and conditions can be employed as they are. For example, the pessure nozzle type, the two fluid nozzle type, the rotary disk type and like types of spray dryers can be used. The slurry concentration to be charged to the spray dryer preferably ranges from about 10 to about 50% by weight, calculated as the oxides of the elements constituting the catalyst.

The temperature of the spray drying is not critical. It is preferred from the point of view of convenience of operation for the slurry which has been subjected to the heating processing or the slurry to which a pulverized catalyst has been added, to be subjected to spray drying operation as it is and immediately. However, this is not essential. The slurry may be subjected to spray drying after a lapse of a long period of time if such is appropriate for operational reasons, and after adjusting the slurry concentration, the slurry may be subjected to spray drying.

While the temperature at which the spray drying is effected is not critical, it is preferred for the temperature of the hot air used for the drying to be at a temperature of from about 200° to about 500° C, preferably from about 300° to about 400° C, at the inlet of the apparatus and at a temperature of from about 100° to about 300° C, preferably from about 100° to about 200° C, at the outlet of the apparatus. The atmosphere into which the spray drying is effected, is not critical, but it is preferably effected in a reducing atmosphere. For economic reasons, combustion gasses containing an excess of air are advantageously used.

By this spray drying, spherical particles whose particle diameter usually fall in a range of from about 5 to about 200 $\mu$, are formed. Those extremely fine particles and/or coarse particles are separated from these particles.

The particle diameter of the extremely fine particles and/or coarse particles to be separated out varies with the fluidized reaction apparatus and reaction conditions, and also with the particle density of the catalyst. Therefore, taking into account the physical properties of the catalyst and the conditions under which the catalyst is to be used, the diameter of the particles to be separated should be determined. Generally speaking, however, the extremely fine particles have a diameter of not more than about 10 to 30 $\mu$ and the coarse particles have a diameter of not less than about 60 to 200 $\mu$. Also, those cakes formed at the time of spray drying (those attached to the inner surface of the spray drying apparatus) can be considered to be coarse particles. With regard to the spherical particles from which the extremely fine particles and/or coarse particles have been separated, it is preferred for those particles having diameter of not more than about 20 $\mu$ to occupy not more than 5% by weight of the total particles and those particles having a diameter of not less than about 200 $\mu$ to occupy not more than 15% by weight of the total weight of the particles.

Separation of the extremely fine particles can be conducted by the use of a cyclone separator attached to the spray drying apparatus, and where the separation must be carried out strictly, the separation can be conducted by installing a classification apparatus. In particular, where the catalyst for use as make-up as described above are produced, a catalyst having a narrow distribution of relatively small particles and containing neither extremely fine particles nor coarse particles is preferred, and in this case, the use of the classification apparatus is preferred. By such a classification operation, the spray dried particles are hardly subject to fracture and abrasion.

On the other hand, the extremely fine particles and/or coarse particles separated as described above are pulverized using e.g., a known grinder such as a colloid mill, a ball mill, a vibration mill or the like. Pulverization to a high extent is especially preferred. At this time, either water may be added to the particles or the slurry prior to the spray drying may be mixed. On account of the insufficient strength of the particles, the pulverization of the particles can be effected relatively easily and most of the particles can be pulverized to a size of several microns or less in a short time by wet pulverization. Since the large particles contained in the slurry deteriorate the condition of the finished catalyst, it is preferred for most of the particles to be pulverized to not more than about 10 μ. Depending upon the composition of the catalyst, and spray drying conditions, the particles can be sometimes pulverized only by mixing with water without applying any pulverization processing.

The thus obtained extremely fine particles or pulverized particles are mixed with the slurry prior to the spray drying thereof as described above. Incorporation of the particles into the slurry prior to the spray drying can be effected at the steps of preparing the slurry such as on mixing of the starting materials for the catalyst, and the adjustment of the pH, etc. Alternatively, the particles can be incorporated into the slurry after the heating processing. That is, at which step the particles are incorporated is determined solely by ease of operation to prepare the catalyst. It is most convenient for operation for the particles to be incorporated into the slurry after the heating processing, but no marked change occurs in the characteristics of the finished catalyst regardless of when the particles are added. This mixing can be effected by the use of usual stirring apparatus or homogenizer.

The slurry with the above particles mixed therewith as described above, which is prior to the spray drying, is subjected to a spray drying operation to form substantially spherical particles and to separate the extremely fine particles and/or coarse particles.

It is possible for the above described extremely fine particles and/or coarse particles not to be mixed with the slurry prior to the spray drying, but an aqueous slurry of the particles alone is prepared and subjected to the spray drying to form spherical particles.

The thus obtained spherical particles from which extremely fine particles and/or coarse particles have been removed are calcined at about 200° to about 600° C for about 0.5 to 20 hours to remove water, salts, and other volatile components. The spherical particles are then subjected to a final calcination at a temperature ranging from about 400° C to 1100° C for about 0.5 to about 50 hours to prepare the catalyst.

The manner in which the pre-calcination and final calcination are effected, is not critical, and these calcinations can be effected by the use of furnaces such as a box type furnace, a tunnel furnace, a rotary furnace, a fluidized bed furnace, etc. As a method of heating, gas heating, electric heating, etc., can be employed.

In accordance with the method of the present invention, those extremely fine particles and/or coarse particles separated from the spherical particles, which have been obtained by the spray drying of the slurry, can be re-used, thereby increasing the production efficiency of the catalyst, which is quite advantageous from an economic standpoint. Since the extremely fine and/or coarse particles are not calcined and have insufficient strength, where a pulverization thereof is required, the pulverization can be easily carried out. Furthermore, in the spray drying of the slurry containing these particles, the spherical particles can be produced without causing the problem of abrasion of the apparatus. In addition, the thus produced catalyst whose diameter has been controlled is a practical catalyst having a high strength and a sufficient activity.

Since the finished catalyst does not contain any extremely fine particles, the loss of the catalyst through the reaction is small and the catalyst consumption is decreased. Therefore the formation of waste catalysts decreases, which is preferred for operation.

Moreover, where the fine particle portion is scattered and lost during the reaction and the particle size distribution moves to a larger particle diameter, resulting in a deterioration of the fluidized state and a reduction in contacting efficiency, the catalyst having the desired particle diameter, i.e., hardly containing extremely fine particles and having a small average diameter, for example, most of the particles fall in the range of 20 to 80 μ, can be produced and supplemented to the reaction system to thereby improve the fluidized state and contacting efficiency.

While the most suitable particle size distribution varies with the scale and system of the reaction apparatus, any requirements can be met by application of the method of the present invention.

The present invention will be further explained by reference to the following examples and comparison examples. Unless otherwise indicated herein, all parts, percents, ratios and the like are by weight.

EXAMPLE 1

A catalyst for fluidized bed use and having the empirical formula; $Fe_{10}Sb_{25}O_{65}(SiO_2)_{30}$ was produced as follows:

(I) 5.65 Kg of antimony trioxide powder was weighed out.

(II) 0.865 Kg of electrolytic iron powder was weighed out. A mixture of 6.25 l of nitric acid having a specific gravity of 1.38 and 7.75 l of water was heated to about 80° C, in which the iron powder was dissolved by gradually adding the iron powder thereto.

(III) 13.9 Kg of a silica sol containing 20% by weight of $SiO_2$ was weighed out.

(I), (II), and (III) were mixed and the pH of the resulting mixture was adjusted to 2 by gradually adding aqueous ammonia of a concentration of 15% by weight with stirring well. The thus obtained slurry was heated for 2 hours at 100° C while stirring well.

This slurry was then spray-dried using a rotary disc type spray drying apparatus and at this time fine particles of not more than 20 μ were caught by controlling the cyclone. These particles were wet-pulverized using a ball mill to control the diameter thereof to not more than 20 μ.

This pulverized product was added to a slurry, which had been prepared by the same method as described above and which had been subjected to heating processing, in an amount of 5%, calculated as the oxides of completed catalyst, to which water was then added. The resulting mixture was homogenized. This slurry was spray-dried by the use of the above described spray drying apparatus, and at the same time those fine particles of not larger than 20 μ in diameter were classified and separated. The thus obtained particles were calcined for 2 hours at 200° C, for 2 hours at 400° C and further for 3 hours at 850° C.

EXAMPLES 2 to 5

Catalysts for fluidized bed use and having the empirical formula: $Fe_{10}Sb_{25}O_{65}(SiO_2)_{30}$ were produced in the same manner as described in Example 1 except that the amount of the fine particle to be added to the slurry subjected to the heating processing was changed to 10% (Example 2), 15% (Example 3), 50% (Example 4) or 70% (Example 5), all calculated as the oxides of the completed catalyst.

EXAMPLES 6 and 7

Catalyst for fluidized bed use and having the empirical formula: $Fe_{10}Sb_{25}O_{65}(SiO_2)_{30}$ were produced as follows:

A slurry prepared by the same method as described in Example 1 was subjected to a spray drying operation. At this time, cakes remaining in the spray drying apparatus, i.e., spray-dried masses, were removed from the apparatus and these cakes were wet-pulverized in a ball mill to reduce the particle diameter to not more than 10 $\mu$.

This pulverized product was added to a slurry, which had been produced in the same manner as in Example 1 and subjected to heating processing, in such a manner that the amount, calculated as the oxide of the completed catalyst, was 15% (Example 6) and 50% (Example 7), which was then homogenized. This slurry was spray-dried using a spray drying apparatus and at the same time, those fine particles of not more than 20 $\mu$ were classified and separated. The thus obtained particles were calcined under the same conditions as in Example 1.

EXAMPLE 8

A catalyst for fluidized bed use and having the empirical formula: $Fe_{10}Sb_{25}O_{65}(SiO_2)_{30}$ was produced as follows:

A slurry prepared by the same method as described in Example 1 was spray-dried and at the same time, those particles of not more than 20 $\mu$ were classified and combined together. Pure water was added so that the amount of the above particles calculated as the oxides of the completed catalyst, was 20%, and the resulting mixture was heated to 100° C and allowed to stand for 30 minutes. After homogenization, the slurry was spray-dried and those fine particles of not more than 20 $\mu$ were classified and separated in the same manner as described above. The thus obtained particles were calcined under the same conditions as in Example 1.

COMPARISON EXAMPLE 1

A catalyst for fluidized bed use and having the empirical formula: $Fe_{10}Sb_{65}O_{65}(SiO_2)_{30}$ was prepared as follows:

(I) 5.65 Kg of antimony trioxide powder was weighed out.

(II) 0.856 Kg of electrolytic iron powder was weighed out. A mixture of 6.25 l of nitric acid having a specific gravity of 1.38 and 7.75 l of water was heated to about 80° C, to which the above iron powder was gradually added to completely dissolve the iron therein.

(III) 13.9 Kg of a silica sol containing 20% by weight of $SiO_2$ was weighed out.

(I), (II), and (III) were mixed, and the pH of the mixture was adjusted to 2 by gradually adding aqueous ammonia of a concentration of 15% by weight while stirring well. The thus obtained slurry was heated for 2 hours at 100° C while stirring well.

This slurry was then spray-dried by using a rotary disc type spray drying apparatus. The thus obtained particles were calcined at 200° C for 2 hours, at 400° C for 2 hours and further at 850° C for 3 hours.

COMPARISON EXAMPLES 2 to 5

Catalysts for fluidized bed use and having the empirical formula: $Fe_{10}Sb_{25}O_{65}(SiO_2)_{30}$ were produced as follows:

The finally calcined catalyst obtained by the method of Comparison Example 1 was wet-pulverized in a ball mill to reduce the particle diameter to not more than 10 $\mu$. This pulverized product was added to a slurry, which had been prepared by the same method as in Comparison Example 1 and subjected to the heating processing, so that the amount calculated as the oxides of the catalyst was 10% (Comparison Example 2), 15% (Comparison Example 3), 50% (Comparsion Example 4) or 60% (Comparison Example 5). Water was then added thereto and the resulting mixture was homogenized. The thus obtained slurry was spray-dried and the particles so obtained were calcined under the same conditions as in Comparson Example 1.

EXAMPLE 9

A catalyst for fluidized bed use and having the empirical formula: $Fe_{10}Sb_{25}Co_4W_{0.5}Mo_{1.2}Te_3B_1O_{81.6}(SiO_2)_{60}$ was produced as follows:

(I) 2.92 Kg of antimony trioxide powder was weighed out.

(II) 0.447 Kg of electrolytic iron was weighed out. A mixture of 3.2 l of nitric acid (specific gravity 1.38) and 2 l of water was heated. To this mixture was added the iron powder little by little to dissolve the iron therein. 0.932 Kg of cobalt nitrate was added thereto.

(III) 105 g of ammonium tungstate and 170 g of ammonium molybdate were dissolved in 920 ml of water. In addition, 525 g of telluric acid was added and dissolved therein.

(IV) 9.61 Kg of a silica sol containing 30% by weight of $SiO_2$ was weighed out, in which 49 g of boric acid was dissolved.

To (IV) were added (III), (II), and (I) in this order. The pH of the resulting mixture was adjusted to 2 by adding 15% aqueous ammonia while stirring well. The mixture was heated at 100° C for 8 hours with good stirring. This slurry was spray-dried with a rotary disc type spray drying apparatus. From the spherical particles so obtained were separated those particles having a diameter of not more than 20 $\mu$ and not less than 80 $\mu$ by the use of a classification apparatus. The particles of not more than 20 $\mu$ and not less than 80 $\mu$ were combined together and wet-pulverized. This pulverized product was added to a slurry, which had been prepared by the same method as described above and subjected to the heating processing, so that the amount calculated as the oxides of the catalyst was 20% and the resulting mixture was then stirred well. The slurry was spray-dried by the use of the above spray drying apparatus. From the thus obtained spherical particles were separated those particles having a diameter of not more than 20 $\mu$ and not less than 80 $\mu$ by the use of a classification apparatus in the same manner as described above.

The thus obtained particles were calcined at 250° C for 8 hours, at 400° C for 16 hours and finally at 700° C for 4 hours.

COMPARISON EXAMPLE 6

A catalyst for fluidized bed use and having the empirical formula: $Fe_{10}Sb_{25}Co_4W_{0.5}Te_3B_1O_{81.6}(SiO_2)_{60}$ was produced as follows:

A slurry subjected to the heating processing was prepared by the same method as in Example 9, and this slurry was spray-dried by the use of a rotary disc type spray drying apparatus. The spherical particles so obtained were calcined under the same conditions as in Example 9.

EXAMPLE 10

A catalyst for fluidized bed use and having the empirical formula: $Fe_{10}Sb_{25}W_{0.25}Te_{1.0}O_{67.75}(SiO_2)_{30}$ was produced as follows:
(I) Antimony pentachloride was hydrolyzed with aqueous ammonia and the resulting product was weighed out in an amount of 2.59 Kg calculated as $Sb_2O_5$.
(II) 0.358 Kg of electrolytic iron was weighed out. 3 l of nitric acid having a specific gravity of 1.38 was mixed with 4 l of water, which was then heated to about 80° C. In this mixture was dissolved completely the iron powder by gradually adding the iron thereto.
(III) 41.8 g of ammonium tungstate was weighed out and dissolved in 1.5 l of water.
(IV) 147 g of telluric acid was weighed out and dissolved in 1 l of water.
(V) 3.84 Kg of a silica sol containing 30% by weight of $SiO_2$ was weighed out.

(I), (II), (III), (IV) and (V) were mixed and the pH of the resulting mixture was adjusted to 1 by gradually adding aqueous ammonia of a concentration of 15% by weight while stirring well.

The thus obtained slurry was heated at 100° C for 4 hours while stirring.

This slurry was then spray-dried by the use of a rotary disc type spray-drying apparatus. From the spherical particles so obtained were separated those particles of not more than 25 μ and not less than 80 μ by the use of a classification apparatus. The particles of not more than 20 μ and not less than 80 μ were wet-pulverized in a vibration mill. This pulverized product was added to a slurry, which had been produced by the same method as described above and subjected to the heating processing, so that the amount calculated as the oxides of the completed catalyst was 10%. The mixture so obtained was stirred well. This slurry was spray-dried by the use of the above described spray drying apparatus. From the spherical particles so obtained were separated those particles of not more than 25 μ and not less than 80 μ by the use of a classification apparatus in the same manner as described above.

The thus obtained particles were calcined at 200° C for 4 hours, at 400° C for 4 hours and finally at 830° C for 4 hours.

COMPARISON EXAMPLE 7

A catalyst for fluidized bed use and having the empirical formula: $Fe_{10}Sb_{25}W_{0.25}Te_{1.0}O_{67.75}(SiO_2)_{30}$ was produced as follows:

A slurry was prepared by the same method as in Example 10 and spray-dried by the use of a rotary disc type spray drying apparatus. The spherical particles obtained were calcined under the same conditions as in Example 10.

EXAMPLE 11

A catalyst for fluidized bed use and having the empirical formula: $U_{10}Sb_{40}O_{106.7}(SiO_2)_{50}$ was produced as follows:

(I) 4.79 Kg of antimony pentachloride was weighed out. A lump of ice was floated in 20 l of water, into which antimony pentachloride was gradually poured. Then 28% aqueous ammonia was gradually added thereto to adjust the pH thereof to 8. The precipitate formed was filtered and washed three times with 3 L of water.
(II) 2.0 Kg of uranyl nitrate $(UO_2(NO_3)_2 \cdot 6H_2O)$ was weighed out and dissolved in 5 l of water.
(III) 6 Kg of a silica sol containing 20% by weight of $SiO_2$ was weighed out.

(I), (II) and (III) were mixed, and the pH of the resulting mixture was adjusted to 2.0 by gradually adding 15 wt% aqueous ammonia while stirring well.

The thus obtained slurry was heated at 100° C for 5 hours while stirring well.

This slurry was spray-dried in a conventional manner by the use of a rotary disc type spray drying apparatus. From the spherical particles obtained were separated those particles of not more than 20 μ and not less than 80 μ by the use of a classification apparatus. The particles of not more than 20 μ and not less than 80 μ were combined together and wet-pulverized in a vibration mill so that the particle diameter was not more than 10 μ. This pulverized product was added to a slurry, which had been prepared by the same method as described above and subjected to the heating processing, so that the amount calculated as the oxide of the completed catalyst was 18%. The resulting mixture was stirred well. Then the slurry was spray-dried with the above described spray drying apparatus. From the spherical particles so obtained were separated those particles of not more than 20 μ and not less than 80 μ in the same manner as described above by the use of a classification apparatus.

The thus obtained particles were calcined at 200° C for 4 hours, at 400° C for 4 hours and finally at 800° C for 4 hours.

COMPARISON EXAMPLE 8

A catalyst for fluidized bed use and having the empirical formula: $U_{10}Sb_{40}O_{106.7}(SiO_2)_{50}$ was produced as follows:

A slurry was prepared by the same method as used in Example 11 and subjected to the heating processing. This slurry was spray-dried by the use of a rotary disc type spray drying apparatus. The spherical particles obtained were calcined under the same conditions as employed in Example 11.

EXAMPLE 12

A catalyst for fluidized bed use and having the empirical formula: $Fe_{10}Sb_{20}Mo_{0.5}W_{0.2}Te_{1.5}Cu_1Ni_3O_{64.1}(SiO_2)_{30}$ was produced as follows:

The same method as in Example 1 was employed except that ammonium paramolybdate, ammonium tungstate, telluric acid, copper nitrate and nickel nitrate were used as the starting materials for Mo, W, Te, Cu and Ni, respectively. These materials were added to the slurry prior to the adjustment of pH to produce a heat-processed slurry.

This slurry was then spray-dried in a conventional manner by the use of a rotary disc type spray drying apparatus, and at this time, those particles of not more than 20 μ were classified and caught by controlling a cyclone classifier. These particles were wet-pulverized by the use of a ball mill to reduce the diameter to not more than 15 μ.

This pulverized product was added to a slurry, which had been produced by the same method as described above and subjected to the heating processing, so that the amount was 15% calculated as the oxide of the completed catalyst, and the resulting mixture was stirred well. The mixture was then spray-dried by the use of the above spray drying apparatus and those particles of not more than 20 μ were separated by controlling the cyclone.

The spherical particles so obtained were calcined under the same conditions as in Example 1.

EXAMPLE 13

A catalyst for fluidized bed use and having the empirical formula: $Fe_{10}Sb_{20}Mo_{0.1}V_{0.1}W_{0.6}Te_{1.5}Zn_2O_{62.4}(SiO_2)_8$ was produced by the same method as in Example 12. In this case, however, ammonium metavanadate and zinc nitrate were used as the starting materials for V and Zn, respectively. Classification, pulverization, amount of pulverized product to be added, and calcination of the spherical particles obtained were effected under the same conditions as in Example 12.

EXAMPLE 14

A catalyst for fluidized bed use and having the empirical formula: $Fe_{10}Sb_{25}Mo_{0.3}W_{0.5}Te_{2.0}Mg_4O_{75.4}(SiO_2)_{50}$ was produced by the same method as in Example 12. In this case, however, magnesium nitrate was used as the starting material for Mg. Classification, pulverization, amount of the pulverized product to be added, and calcination of the spherical particles obtained were conducted under the same conditions as in Example 12.

Test Methods and Test Results of Catalysts

The catalysts obtained in the above examples and comparison examples were tested.

(a) Catalyst Attrition Resistance Test

This test was conducted in accordance with the method described in "Test Methods for Synthetic Cracking Catalysts" 6/31-4m-1/57, published by American Cyanamid Co., and known in the art as a test method for fluid catalyst cracking catalysts, the so-called FCC-catalysts.

The test was conducted on catalyst particles ranging from 44 to 88 microns in diameter The R-value with respect to attrition loss (percent) given in Table 1 were calculated on the basis of the following relationship.

$$R = (B/C - A) \times 100$$

wherein $A$ represents the weight in grams of catalyst lost by attrition continued for a period of time from 0 to 5 hours; $B$ represents the weight in grams of catalyst lost by attrition continued for a period of time of from 5 to 20 hours; and $C$ represents the weight in grams of catalyst tested by the present test ($C = 50$ in the tests here conducted). A smaller value indicates greater strength.

(b) Catalyst Activity Test

A catalyst was charged to a reactor in which the inner diameter of a fluidized catalyst area was 2 inches and baffle plates were provided therein in such a manner that a predetermined contact time was obtained.

As starting materials, propylene, ammonia and air were introduced into the above reactor in a proportion of 1:1.2:11 (molar ratio) so as to provide a linear velocity of 13 cm/sec.

Gaseous products were gas-chromatographed for quantitative analysis.

With regard to the results obtained, catalyst attrition resistance test results are shown in Table 1 and catalyst activity test results are shown in Table 2. The particle size distribution of the catalysts of the examples and comparison examples are shown in Table 3.

Table 1

| | Invention | | | Comparison | |
|---|---|---|---|---|---|
| Catalyst | Proportion of Pulverized Product Present (wt %) | Attrition Loss (wt %) | Catalyst | Proportion of Pulverized Product Present (wt %) | Attrition Loss (wt %) |
| Ex. 1 | 5 | 2.0 | Com. Ex. 1 | 0 | 2.3 |
| Ex. 2 | 10 | 1.8 | Com. Ex. 2 | 10 | 2.4 |
| Ex. 3 | 15 | 1.9 | Com. Ex. 3 | 15 | 3.1 |
| Ex. 4 | 50 | 2.0 | Com. Ex. 4 | 50 | 4.3 |
| Ex. 5 | 70 | 1.9 | Com. Ex. 5 | 60 | 18 |
| Ex. 6 | 15 | 1.7 | | | |
| Ex. 7 | 50 | 2.0 | | | |
| Ex. 8 | 100 | 2.2 | | | |
| Ex. 9 | 20 | 1.9 | Com. Ex. 6 | 0 | 2.0 |
| Ex. 10 | 10 | 1.0 | Com. Ex. 7 | 0 | 1.3 |
| Ex. 11 | 18 | 1.2 | Com. Ex. 8 | 0 | 1.3 |
| Ex. 12 | 15 | 1.6 | | | |
| Ex. 13 | 15 | 1.0 | | | |
| Ex. 14 | 15 | 1.5 | | | |

Table 2

| Catalyst | Reaction Temperature (° C) | Contact Time (sec) | Yield of Acrylonitrile (%) |
|---|---|---|---|
| Ex. 6 | 460 | 6 | 66 |
| Ex. 8 | 460 | 6 | 67 |
| Com. Ex. 1 | 460 | 6 | 65 |
| Ex. 9 | 430 | 4 | 82 |
| Com. Ex. 6 | 430 | 4 | 82 |
| Ex. 12 | 430 | 4 | 84 |

Note:
(1) Yield of Acrylonitrile (%) = $\frac{\text{Moles of Acrylonitrile Produced}}{\text{Moles of Propylene Fed}} \times 100$ (2) In the Catalyst column, Ex. 1, for example, means that the catalyst produced in Example 1 was tested.

Table 3

| Catalyst | Particle Less than 20 μ | Size Less than 44 μ | Distribution(wt %) Greater than 88 μ | Average Size (50% diameter) (μ) |
|---|---|---|---|---|
| Ex. 1 | 1 | 38 | 8 | 51 |
| Ex. 2 | 0 | 32 | 11 | 53 |
| Ex. 3 | 2 | 39 | 9 | 50 |
| Ex. 4 | 0 | 42 | 7 | 48 |
| Ex. 5 | 0 | 37 | 13 | 52 |
| Ex. 6 | 0 | 35 | 11 | 52 |
| Ex. 7 | 0 | 36 | 15 | 54 |
| Ex. 8 | 0 | 37 | 12 | 52 |
| Ex. 9 | 1 | 47 | 2 | 49 |
| Ex. 10 | 0 | 37 | 2 | 53 |
| Ex. 11 | 0 | 45 | 0 | 47 |

Table 3-continued

| Catalyst | Particle Size | | Distribution(wt %) | Average Size |
|---|---|---|---|---|
| | Less than 20 μ | Less than 44 μ | Greater than 88 μ | (50% diameter) (μ) |
| Ex. 12 | 2 | 35 | 10 | 46 |
| Ex. 13 | 1 | 38 | 8 | 50 |
| Ex. 14 | 1 | 36 | 12 | 50 |
| Com. Ex. 1 | 9 | 48 | 10 | 46 |
| Com. Ex. 2 | 8 | 46 | 11 | 48 |
| Com. Ex. 3 | 10 | 49 | 9 | 45 |
| Com. Ex. 4 | 12 | 50 | 7 | 44 |
| Com. Ex. 5 | 11 | 47 | 8 | 46 |
| Com. Ex. 6 | 11 | 51 | 7 | 43 |
| Com. Ex. 7 | 10 | 48 | 8 | 46 |
| Com. Ex. 8 | 15 | 48 | 10 | 45 |

Summary of Test Results

The results in Table 1 indicate that the catalysts prepared in the Examples had good strength irrespective of the proportion of the pulverized product incorporated therein.

The results in Table 2 indicate that the catalysts prepared in the Examples did not adversely influence the reaction even though the pulverized product of the spray-dried product was incorporation therein.

With regard to the loss of the catalyst, the catalyst activity test results indicate that there was no loss in catalyst with the catalyst of the Examples wherein with the catalysts of the Comparison Examples, catalyst was lost during the reaction.

While the invention has been described in detail and with reference to specific embodiments thereof, it will be apparent to one skilled in the art that various changes and modifications can be made therein without departing from the spirit and scope thereof.

What is claimed is:

1. A process for producing an attrition resistant antimony oxide containing fluidized bed catalyst having a controlled particle size distribution, the process comprising:
    (a) preparing a slurry containing a pentavalent antimony compound, one or more polyvalent metal compounds and a silica sol as essential components;
    (b) adjusting the pH of the above slurry to not more than about 7 and heating the slurry at a temperature of from about 40° C to about 150° C for at least 20 minutes while keeping the slurry in a slurry state to form a slurry containing pentavalent antimony;
    (c) spray drying the thus obtained slurry to form substantially spherical particles;
    (d) separating those extremely fine particles and/or coarse particles unsuitable for practical use from the above obtained spherical particles and returning these separated particles to the slurry prior to the spray drying in step (c) as they are or after a pulverization thereof; and
    (e) calcining the particles not containing the extremely fine particles and/or coarse particles at a temperature of from about 400° C to about 1100° C.

2. The process according to claim 1, wherein the pentavalent antimony compound is at least one compound selected from the group consisting of antimony pentoxide, antimonic acid, antimony pentachloride, antimony pentoxide sol and the oxidized product of antimony trioxide with hydrogen peroxide or potassium permanganate.

3. The process according to claim 1, wherein the polyvalent metal compound is a compound of metal selected from the group consisting of iron, cobalt, nickel, tin, uranium, copper, manganese, titanium, vanadium, molybdenum, tungsten, tellurium, bismuth, thorium, cerium, magnesium, zinc, aluminum and zirconium.

4. The process according to claim 1, wherein the atomic ratio of the polyvalent metal compound to the antimony ranges from about 1:10 to about 5:1.

5. The process according to claim 1, wherein in the spray-drying of step (c), the temperature of the hot air ranges from about 200° C to about 500° C at the inlet portion thereof, and ranges from about 100° C to about 300° C at the outlet portion thereof.

6. The process according to claim 1, wherein those particles having a particle diameter of not more than about 20 μ and of not less than about 200 μ are separated from the spherical particles obtained in the spray drying of step (c).

7. The process according to claim 1, wherein those particles having a particle diameter of not less than about 80 μ are separated from the spherical particles obtained in the spray drying of step (c).

8. The process according to claim 6, wherein the particles separated are pulverized to reduce the particle diameter thereof to not more than about 10 μ.

9. The process according to claim 1, wherein the spherical particles obtained by the spray drying of step (c), from which the extremely fine particles and/or coarse particles have been separated, comprise those particles of a particle diameter of not more than about 20 μ occupying not more than 5% by weight of the total weight of the particles and those particles of a particle diameter of not less than about 200 μ occupying not more than 15% by weight of the total weight of the particles.

10. A process for producing an attrition resistant antimony oxide containing fluidized bed catalyst having a controlled particle size distribution, the process comprising:
    (a) preparing a slurry containing a trivalent antimony compound, one or more polyvalent metal compounds, a silica sol, ferric ions and nitrate ions as essential components;
    (b) adjusting the pH of the slurry to not more than about 7 and then heating the slurry at a temperature of from about 40° C to about 150° C for at least 20 minutes while keeping the slurry in a slurry state to form a slurry containing pentavalent antimony;
    (c) spray-drying the slurry so obtained to form substantially spherical particles;
    (d) separating those extremely fine particles and/or coarse particles unsuitable for practical use from the particles obtained and returning the particles separated to the slurry prior to the spray drying of step (c) as they are or after pulverization thereof; and
    (e) calcining the particles not containing the extremely fine particles and/or coarse particles at a temperature of from about 400° C to about 1100° C.

11. The process according to claim 10, wherein the trivalent antimony compound is at least one compound selected from the group consisting of antimony trioxide, antimony trichloride, the nitric acid oxidized product of metallic antimony, and the hydrolysis product of antimony trichloride.

12. The process according to claim 10, wherein the polyvalent metal compound is a compound of metal selected from the group consisting of iron, cobalt, nickel, tin, uranium, chromium, copper, manganese, titanium, vanadium, molybdenum, tungsten, tellurium, bismuth, thorium, cerium, magnesium, zinc, aluminum and zirconium.

13. The process according to claim 10, wherein the atomic ratio of polyvalent metal compound to the antimony is from about 1:10 to about 5:1.

14. The process according to claim 10, wherein for the spray drying of step (c), the temperature of the hot air ranges from about 200° C to about 500° C at the inlet portion thereof, and ranges from about 100° C to about 300° C at the outlet portion of the apparatus.

15. The process according to claim 10, wherein those particles of a particle diameter less than about 20 $\mu$ and/or those particles of a particle diameter more than about 200 $\mu$ are separated from the spherical particles obtained by the spray drying of step (c).

16. The process according to claim 10, wherein the particles of a particle diameter more than about 80 $\mu$ are separated from the spherical particles obtained by the spray drying of step (c).

17. The process according to claim 15, wherein the particles separated are pulverized to reduce the particle diameter thereof to not more than about 10 $\mu$.

18. The process according to claim 10, wherein the spherical particles obtained by the spray drying of step (c), from which the extremely fine particles and/or coarse particles have been separated, comprise those particles of a particle diameter not more than about 20 $\mu$ occupying not more than 5% by weight of the total weight of the particles and those particles of a particle diameter not less than about 200 $\mu$ occupying not more than 15% by weight of the total weight of the particles.

* * * * *